April 4, 1939.  J. KLUDT  2,153,330
LUBRICANT FITTING
Filed Jan. 27, 1938
FIG. 1.
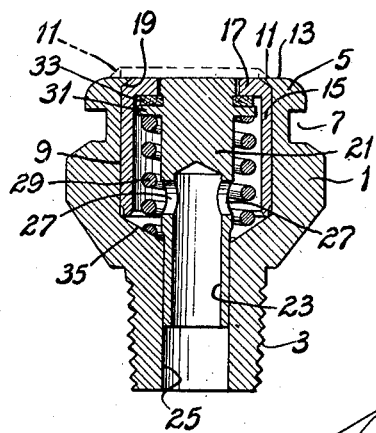
FIG. 4.
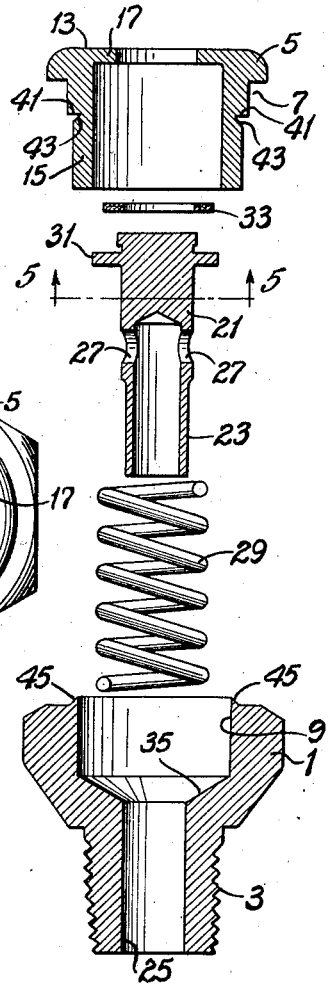
FIG. 2.
FIG. 6.
FIG. 3.
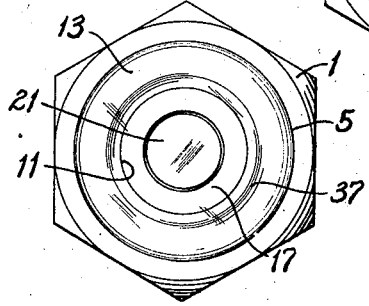
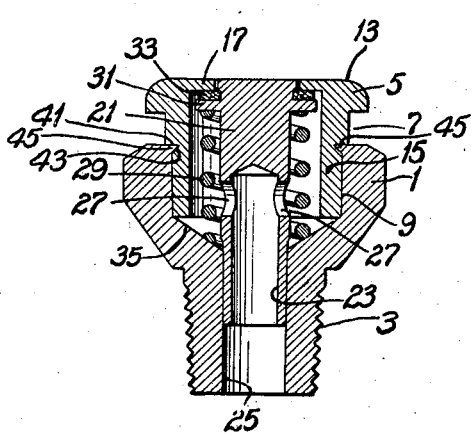
FIG. 5.
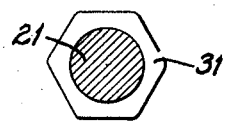
Jonathan Kludt,
Inventor.
Delos G. Haynes
Attorney.

Patented Apr. 4, 1939

2,153,330

UNITED STATES PATENT OFFICE 2,153,330

LUBRICANT FITTING

Jonathan Kludt, Detroit, Mich., assignor to Lincoln Engineering Company, St. Louis, Mo., a corporation of Missouri Application January 27, 1938, Serial No. 187,169

2 Claims. (Cl. 29—157)

This invention relates to lubricant-receiving fittings, and with regard to certain more specific features, to valved fittings of this class having spring closure means.

This invention is an improvement upon the fittings shown in Winkley Reissue Patent No. 14,667, dated June 10, 1919 and Barks Patent 2,083,591, dated June 15, 1937.

Among the several objects of the invention may be noted the provision of a fitting of the class described in which the upper surface, to which the nozzle of a lubricant gun is laterally applied, may be hardened to resist wear without introducing complications into the method of manufacture of the fitting; the provision of a fitting of the class described in which the manufacturing operations are simplified; and the provision of a fitting of this class which is both stronger and more durable. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a vertical section illustrating the characteristics of old fittings of this class;

Fig. 2 is a plan view of Fig. 1;

Fig. 3 is a vertical section, corresponding to Fig. 1, but showing my new fitting;

Fig. 4 is an exploded view of the new fitting;

Fig. 5 is a horizontal section taken on line 5—5 of Fig. 4; and,

Fig. 6 is a plan view of Fig. 3.

Similar reference characters indicate corresponding parts throughout the several views of the drawing.

Reference to the patents above identified shows the existence in the prior art of a fitting characterized by a body having threaded attaching means for organizing the fitting with a lubricant-receiving passage. The body is hollow and has a head formed by a lower groove. Within the fitting is a spring-pressed valve which closes the inlet opening in the top surface of the fitting. The lubricant-ejecting nozzle which is operable with the fitting has suitable flanged means adapted to slide into the groove under the head of the fitting and a spring-pressed sealing portion which slides across the top of the fitting to effect a lubricant-transmitting seal between the final position of the nozzle on the fitting. The lubricant pressure automatically opens the valve for transmission of lubricant through the fitting.

Referring now more particularly to Fig. 1 herein, the old fitting is shown in solid lines, with dotted lines suggesting one old method of manufacturing the fitting. This method is not detailed in the Barks Patent 2,083,591, not being necessary to the disclosure therein, and for that reason is shown in the present disclosure. Neither is it shown in the Winkley reissue patent because the method is not adaptable to the construction therein shown.

Referring to Fig. 1, numeral 1 indicates the body of the fitting having a threaded lower end 3. The top of the fitting is headed as shown at 5. Beneath the head 5 is a groove 7.

The interior of the body 1 is counterbored as shown at 9 and before assembly this counterbore 9 has an upwardly extending lip or bead 11 extending above the top surface 13 of the head 5.

The purpose of the counterbore 9 and the lip 11 extending therefrom (shown in dotted lines) is to receive with a force fit a liner 15 having an inwardly directed flange 17. At the top outer edge the flange 17 is bevelled or chamfered as shown at 19.

At the time that the liner 15 is forced into position, a valve 21 having a hollow skirt 23 is placed interiorly of the body 1. The hollow skirt 23 slidably fits the outlet 25 of the body 1 and has upper openings 27 therein for effecting a communication at all times between the outlet 25 and the inside of the liner sleeve 15. At the time of this assembly there is also inserted a spring 29 which presses against a head 31. Above the head 31 is a packing 33 for effecting a seal around the joint between the valve and its seat beneath the flange 17. The lower end of the spring seats upon the shoulder 35 between the outlet 25 and the counterbore 9.

After the liner 15 has been forced into position in the counterbore 9, the bead or flange 11 is peened over into the recess left by the chamfer 19. The intention is to produce a smooth top on the fitting, but the end in view is only partially attained by reason of the fact that the peening causes a rough surface which tends to wear the packing of the lubricant nozzle as said nozzle is pulled laterally across the fitting in making the attachment (see the modes of operation of applying the nozzle in the patents above identified). Even if the bead or lip 11 be spun down, nevertheless the operation leaves circular grooves which have a deleterious effect upon the laterally moving packing. The circular form of the rough effect is indicated at numeral 37 in Fig. 2.

Another point to be noted is that the whole body 1, as a practical matter, needs to be ductile in order to leave the lip 11 ductile enough for deformation. Hence the head 5 is unnecessarily soft against wear.

The present invention shown in Figures 3 to 5 overcomes the above difficulties. Like numerals designate like parts.

In the invention the liner 15 of the body 1 is made with a heavier form, as is apparent by comparing Fig. 3 with Fig. 1. Into this liner is machined a shoulder 41 which extends radially inwardly to form a triangular groove 43. Upwardly on the shoulder 41, the liner sleeve 15 provides its portion of the groove 7, and at the top are the head 5 and the flange 17, in one piece. There is no two-piece construction between the flange 17 and the head 5, these two being organized as one part so that a smooth, one-piece upper surface is provided on the head 5. This prevents abrasion on the nozzle packing when the nozzle packing is applied laterally in the manner intended. It will be seen that such a construction is advantageous, even over constructions in which a mere press fit is used between parts 1 and 15.

Instead of providing the bead 11 as in Fig. 1, a bead 45 is provided as an extension upwardly from around the counterbore 9 in body 1, as shown in the exploded view of Fig. 4. This bead is triangular in section, providing an edge having a straight interior and an inwardly sloping exterior. Thus when the parts are assembled from the exploded positions shown in Fig. 4 to the assembled positions shown in Fig. 3, the sleeve 15 is driven into the counterbore 9 with a force fit. As the bead 45 strikes the shoulder 41, the tendency is to lay the bead over inwardly to clinch it into the triangular groove 43 so that thereafter the sleeve 15 and the body 1 are permanently assembled. It is clear that the operation of clinching is automatic as the parts are assembled with force, thus eliminating the separate peening or spinning operation. At the same time the unreliability of a mere press fit is avoided, and also the more complicated assembly operations necessary in the case of the said Winkley patent.

The sleeve 15, in the case of Figures 3 to 5 may be and is hardened all over, including the head portion 5. It is possible to do this, because there is no necessity for peening over any element of the head 5, as was the case with the bead 11 in Fig. 1. Thus the device presents a longer wearing head.

As shown in Fig. 5, the cross section of the valve flange 31 is hexagonal. This permits of lubricant readily flowing past the valve when the valve is forced open by the pressure of the lubricant.

In view of the above it will be seen that the invention has the following advantages:

1. The top of the fitting presents a one-piece, hard, smooth surface around the valve portion 21 which reduces the abrasion upon the coacting packing of the lubricant-ejecting nozzle and has longer wear itself;
2. The section through the head of the fitting is thicker and stronger. This is because of a single thick wall instead of a bushed thinner wall.
3. The manufacturing and assembling operations are easier and cheaper to perform. This is because the peening or clinching operation is automatic upon assembly.
4. The device as an article of manufacture presents a much more finished appearance (compare Figs. 2 and 6).
5. The sleeve 15 may be separately hardened and the body 1 left unhardened. This places the soft bead 45 on an unhardened portion so that it is deformable when necessary but associates it with the hard bead for deforming it upon assembly.

It is to be understood that the disclosed method of manufacture serves also to facilitate assembly even where parts 1 and 15 are both ductile.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:
1. A lubricant-receiving fitting comprising a hollow body portion, a relatively ductile bead extending from said body portion around its hollow portion, a relatively hard sleeve having a groove with a portion engageable with the bead adapted to turn said bead into the groove upon forcing said sleeve into the hollow portion, said sleeve having an inward flange forming a lubricant inlet with a one piece surface surrounding said inlet and spring-pressed valve means located between said sleeve and the body portion and after assembly being normally biased to close said inlet and being permanently retained in position between the body portion and the sleeve.

2. A lubricant-receiving fitting comprising a body, a deformable clincher means on the body, a sleeve having a recess and a portion engageable with the deformable portion of the body to turn said deformable portion into the recess to effect locking upon forcing the sleeve into engagement with the body, said sleeve being hollow and provided with a lubricant inlet, and spring-pressed valve means located between said sleeve and the body, said spring being compressed by assembly and the valve being normally biased by the spring to close said inlet and being retained in position between the sleeve and the body.

JONATHAN KLUDT.